(12) United States Patent
Schuster (10) Patent No.: US 7,865,939 B2
(45) Date of Patent: Jan. 4, 2011

(54) METHOD AND TRANSACTION INTERFACE FOR SECURE DATA EXCHANGE BETWEEN DISTINGUISHABLE NETWORKS

(75) Inventor: Wolfgang Schuster, Karlsruhe (DE)

(73) Assignee: SAP AG, Walldorf (DE)

( * ) Notice: Subject to any disclaimer, the term of this patent is extended or adjusted under 35 U.S.C. 154(b) by 409 days.

(21) Appl. No.: 11/522,098

(22) Filed: Sep. 15, 2006

(65) Prior Publication Data

US 2007/0067837 A1    Mar. 22, 2007

Related U.S. Application Data

(63) Continuation of application No. 10/111,859, filed as application No. PCT/EP00/10568 on Oct. 26, 2000, now abandoned.

(30) Foreign Application Priority Data

Oct. 30, 1999   (DE) .............................. 199 52 527

(51) Int. Cl.
*G06F 7/04*   (2006.01)

(52) U.S. Cl. .................... 726/4; 726/2; 726/11; 726/12; 726/13; 726/14; 726/22; 726/23; 726/24; 726/25; 709/219; 709/229

(58) Field of Classification Search .............. 726/2, 726/4, 11–14, 22–25; 709/219, 229
See application file for complete search history.

(56) References Cited

U.S. PATENT DOCUMENTS

| | | | |
|---|---|---|---|
| 5,699,513 A | 12/1997 | Feigen et al. | |
| 5,826,014 A * | 10/1998 | Coley et al. | 726/12 |
| 6,088,796 A * | 7/2000 | Cianfrocca et al. | 713/152 |
| 6,202,159 B1 * | 3/2001 | Ghafir et al. | 726/3 |
| 6,253,188 B1 * | 6/2001 | Witek et al. | 705/14 |
| 6,317,837 B1 * | 11/2001 | Kenworthy | 726/11 |
| 6,381,644 B2 * | 4/2002 | Munguia et al. | 709/225 |
| 6,510,236 B1 | 1/2003 | Crane et al. | |
| 6,546,423 B1 | 4/2003 | Dutta et al. | |
| 6,697,824 B1 * | 2/2004 | Bowman-Amuah | 709/229 |
| 6,701,432 B1 * | 3/2004 | Deng et al. | 713/153 |
| 6,718,388 B1 * | 4/2004 | Yarborough et al. | 709/227 |
| 6,766,454 B1 * | 7/2004 | Riggins | 713/185 |
| 6,839,842 B1 | 1/2005 | Iverson et al. | |
| 6,944,299 B1 * | 9/2005 | Mallela et al. | 380/262 |
| 7,100,195 B1 * | 8/2006 | Underwood | 726/2 |

(Continued)

FOREIGN PATENT DOCUMENTS

EP   0952715   10/1999

(Continued)

*Primary Examiner*—Kambiz Zand
*Assistant Examiner*—Tongoc Tran
(74) *Attorney, Agent, or Firm*—Fountainhead Law Group PC (57) ABSTRACT

In one embodiment, the present invention includes a method for secure data exchange between an external network and an internal network (1 and 2) via a transaction interface (3), in which an external user can undertake predetermined data transactions within the internal network (2). An interface server (7) and interface memory (11) may be coupled between an external network and an internal network. The present invention discloses security techniquest that may be used, including encryption, request processing, and checking. In one embodiment, a first firewall is coupled between the external network and the interface server and a second firewall is coupled between the interface server and the internal network.

49 Claims, 3 Drawing Sheets

U.S. PATENT DOCUMENTS

| | | | |
|---|---|---|---|
| 7,401,118 B1 * | 7/2008 | Yokota et al. | 709/203 |
| 2002/0044219 A1 * | 4/2002 | Mitts et al. | 348/465 |

FOREIGN PATENT DOCUMENTS

| | | |
|---|---|---|
| WO | WO 97/16911 | 5/1997 |
| WO | WO 99/66385 | 12/1999 |
| WO | WO 00/70839 | 11/2000 |

* cited by examiner

METHOD AND TRANSACTION INTERFACE FOR SECURE DATA EXCHANGE BETWEEN DISTINGUISHABLE NETWORKS

CROSS REFERENCE TO RELATED APPLICATIONS

This invention is a continuation of and claims the benefit of priority from U.S. patent application Ser. No. 10/111,859, filed Apr. 30, 2002 now abandoned, entitled "Method and Transaction Interface for Secure Data Exchange between Distinguishable Networks," which is a National Phase PCT Application and claims the benefit of priority under 35 U.S.C. 120 of Application No. PCT/EP00/10568, filed Oct. 26, 2000, and further claims priority under 35 U.S.C. 119 of German Application No. 199 52 527.7, filed Oct. 30, 1999.

BACKGROUND

The invention relates to a method and transaction interface for secure exchange between distinguishable networks, especially between an external network and an internal network, such as the Internet and a company-owned intranet.

Such methods and devices for secure exchange between networks with mostly different security standards belong to the prior art.

Thus isolation of an internal data network from the external network by a secure interface belongs to the prior art. In the best case, such a secure interface comprises an external server and an internal server, which are in data communication with one another via a firewall. Any customer requests received by the external server are processed in the external server and, after various security checks, are delivered via the firewall to the internal server, which ultimately accesses the data filed within the internal network to be protected.

The firewall disposed between the internal server and external server is supposed to prevent external sources from effecting transactions or changes, especially of improper nature, to the protected database of the internal network.

The actual effect of the firewall is to ensure that external customers lacking appropriate authorization cannot enter into data communication with the internal network and that, if data communication exists, impermissible data such as virus programs cannot be introduced through the firewall into the internal network. Consequently, desired customer service inquiries that are inherently permissible and necessitate internal data transactions are also blocked, for example, for lack of authorization.

A standard solution for this problem comprises opening an additional special customer gateway, which permits appropriate access. This in turn has the disadvantage that attacks on the internal database are now possible via this gateway, even though it is particularly secure.

Another solution leaves all customer questions of any type to the external server, and thus avoids any undesired risky direct data links to external sources. A disadvantage of this solution, however, is that any confidential customer data are temporarily stored on an unprotected external server. For this reason the data are frequently matched by reflection. Because of the resulting greater data volume, this is achieved at the cost of increased processor power, or poorer time response. Moreover, real-time access to the protected database of the internal network is hardly possible in this solution.

A solution to this problem is known from International Application WO 97/19611, in the form of a "security gateway interface" (SGI), which attempts to solve the described problem by providing that, in response to a customer request, authentication of the customer takes place first and, if the customer has the appropriate authorization, the external server then generates its own permissible inquiry on the basis of the customer inquiry. Hereby the data sent by the customer are truly decoupled from the data ultimately intended for further processing. The request generated by the external server is ultimately forwarded via the firewall to an internal server while further security routines are running and finally processed in the internal network, and a response to the user is sent via the external server. Therewith this system ensures complete decoupling of internal and external networks. Nevertheless, the problem remains unsolved that confidential user data still remain on the external server, largely unprotected against access by external sources. If an improper access to the external unprotected server is subsequently successful, some impermissible inquiries can be generated here by sufficiently skilled manipulation. This is possible in particular because authentication of the user inquiry necessarily takes place on the external server and thus in the largely nonsecure area of the system.

SUMMARY

The object of the invention is therefore to provide a method and a device for secure data exchange between distinguishable networks that ensures complete decoupling of the two networks and also avoids the cited disadvantages of the already known prior art.

In one embodiment, objects of the present invention are achieved by a method for secure data exchange between an external network and an internal network (1 and 2) via a transaction interface (3), in which an external user can undertake predetermined data transactions within the internal network (2), wherein the transaction interface (3) comprises a portal in the external network (1), therebehind, in access direction, a neutral zone (5) with at least one interface server (7) and one interface memory (11), as well as an internal server (12), which is already located within the internal network (2), characterized in that inquiries of external users (17), which a data transaction within internal network (2), are conditioned by the interface server (7) and stored temporarily in precisely defined form in the interface memory (11), and complete processing including authentication of the user takes place within the internal network (2).

In one embodiment, objects of the present invention are achieved by a transaction interface for secure data exchange between an external network and an internal network (1 and 2), in which an external user (17) can initiate predetermined data transactions within the internal network (2), for which purpose the transaction interface (3) comprises a neutral zone (5), which in access direction is located behind a portal in the external network (1) and is provided with at least one interface server (7) as well as with at least one interface memory (11), at least one internal server (12), which is located within the internal network (2), characterized in that a queue (22, 22') for temporary storage of user requests is set up within the interface memory (11), the said queue can be queried at a specified frequency by the internal server (12) and in that, after the appropriately conditioned requests have been sent to the internal server (12), complete processing of the requests, including user authentication, is provided within the internal network.

By the fact that, in contrast to the prior art, all inquiries of external users are conditioned by an interface server and stored temporarily in precisely defined form in an interface memory, whereas complete processing of these inquiries including authentication of the user takes place within the secure internal network, no access whatsoever to security-related data areas of the internal network is possible from external sources.

In one embodiment, the method is characterized in that the following steps take place in sequence: any user requests received via the portal are read and if necessary acknowledged by the interface server (7), which is located within the neutral zone (5), if such an acknowledgement is necessary, it is sent to the user, the interface server (7) checks the permissibility of the request by comparison with a set of predetermined permissible requests and their semantic correctness, the request being rejected in the case of error and otherwise being further processed. In the case of further processing, the interface server (7) places the request in a queue (22,22'), which is set up within the interface memory (11), this queue (22,22') is queried at a specified frequency by the internal server (12). In response to this query the conditioned request is sent into the internal network (2). Complete processing, including authentication of the user (17), then takes place in the internal network (2). The result is returned to the interface server (7) and checked to determine whether the result and the inquiry match. If affirmative, a response is output to the user (17).

In one embodiment, the method is characterized in that the user requests from the external network (1) are delivered under scrutiny of an external firewall (4) into the neutral zone (5).

In one embodiment, the method is characterized in that the data exchange between the neutral zone (5) and the internal network (2) is processed under scrutiny of an internal firewall (6).

In one embodiment, the method is characterized in that an external server (10), preferably a web server, is additionally located in the neutral zone (5), at least part of the user requests being sent via this external server (10) to the interface server (7).

In one embodiment, the method is characterized in that inquiries once received in the queue (22,22') of the interface server (11) are stored resistantly until they have been completely handled or until a specified time has elapsed.

In one embodiment, the method is characterized in that the frequency of querying of the queue is varied as a function of the number and/or of the power of the user inquiries by means of an appropriate frequency-control function.

In one embodiment, the method is characterized in that parallel processes are enabled or deactivated within the interface server (7) and/or internal server (12) as a function of the number and/or of the power of the user inquiries.

In one embodiment, the method is characterized in that, within the neutral zone (5) there is located a plurality of interface servers (7), which are activated or deactivated according to the number and/or power of the user requests, the load control necessary for this purpose being exerted by means of the external server (10) and/or by means of a load-control module of the external firewall (4).

In one embodiment, the method is characterized in that, within the internal network (2), there is located a plurality of internal servers (12), which are activated or deactivated according to the number and/or power of the user requests, the load control necessary for this purpose being exerted by means of the interface server (7) and/or by means of a load-control module of the internal firewall (6).

In one embodiment, the method is characterized in that the user inquiries are encrypted within the neutral zone (5) before being sent into the internal zone (2).

In one embodiment, the method is characterized in that the respective keys used for encryption have an individually pre-determinable life.

In one embodiment, the method is characterized in that authentication of the user (17) takes place independently of the other processing of the user inquiry.

In one embodiment, the method is characterized in that the following steps for authentication of the user (17) take place in sequence: a user ID and a user password are separated from the user inquiry in the neutral zone (5), upon request of the internal server (12), the user ID is sent to the internal network (2), the user ID is encrypted in the internal network (2) using the password filed for this user ID in the internal network (2), and the user ID encrypted in this way is delivered back into the neutral zone (5), the user ID returned from the internal network (2) is decrypted using the password entered by the user (17) and stored temporarily in the neutral zone (5), the decrypted user ID and that entered by the user are compared, authenticity of the user being confirmed in the case of a match and denied otherwise, after which the user inquiry is or is not further processed depending on the said comparison.

In one embodiment, a queue set up in the interface memory is queried exclusively by the internal server at a specified frequency. Accordingly, it is not possible actively to initiate any kind of data transaction in the internal network from an external network, since all actions proceed from the secure area of the internal network and are also initiated from here and ultimately are completely processed here. They also include in particular authentication of the user.

The security level of the method can be further enhanced by using an external firewall between the neutral zone and the external network connected at the front end. Moreover, improper access to data filed in the neutral zone is made more difficult hereby, even if these data are not inherently relevant to security.

In this context a further enhancement of the security standard is achieved by interposing a further internal firewall between the neutral zone and the internal network. The internal firewall also ensures effective protection against espionage from internal sources, or in other words access from the internal network to user data filed in the neutral zone.

The internal firewall enforces exclusively unidirectional communication. In principle, therefore, calls are accepted only from the area of the internal network. A call from the neutral zone into the area of the secure internal network is not possible.

User inquiries can be received in different data formats. For this purpose it may be practical to provide, in the neutral zone, a special external server, which is responsible for specified selected data formats and which first converts the user inquiries received here before forwarding them to the actual interface server and if necessary sends confirmation of receipt to the user.

By the fact that inquiries once received in the queue of the interface server are temporarily stored resistantly until they have been completely handled, processing can be resumed substantially without data loss even after a complete system crash. In the worst case, processing of the inquiry must be repeated. Hereby the inventive method is robust to the highest degree. This represents a feature of both data security and operator friendliness.

A further performance feature of the inventive method is that the processing speed can be adapted to the respective load. One way in which this is achieved is by load-dependent control of the frequency of querying of the interface memory.

This can also be achieved advantageously, however, by activation of parallel processes within the interface server and/or the internal server. Load control is then effected by the external server of the system or by means of a load-control module of the firewall. This is practical because the load controller is hereby positioned at locations disposed in front of the interface server and/or internal server, and thus the necessary processor capacities can be prepared before they are needed. The operator friendliness of the system is also enhanced hereby.

Besides the interconnection and activation of further processes under software control, additional processor activities can also be enabled or disabled by appropriate load control.

The user inquiries filed in the interface memory are advantageously encrypted. The encryption of these inquiries makes access to any confidential user inquiries more difficult not only from outside sources but also from inside sources. Espionage from both external and internal sources is also prevented hereby.

In one embodiment a special security feature is achieved by the individually predeterminable life of the key used in each case. This means that, even if a hacker were to be successful in decrypting a key being used, it is far from certain that he could achieve a successful improper use or even a data transaction, since the time corridor defined upon allocation of the key is so narrow that an improper second use of the key already appears to be as good as prevented by virtue of its limited life.

A further substantial security feature of the method is that authentication of the respective user takes place separately from the actual processing operation.

Although authentication of the user takes place completely within the secure area of the internal network, at no time is the respective password allocated to a user sent from the neutral zone into the internal network or in the opposite direction.

The method is advantageously effected with a transaction interface.

In one embodiment, the transaction interface is characterized in that the neutral zone (5) is insulated from the external network (I) by means of an external firewall (4).

In one embodiment, the transaction interface is characterized in that the internal network (2) is insulated from the neutral zone (5) by means of an internal firewall (6).

In one embodiment, the transaction interface is characterized in that there is additionally provided within the neutral zone (5) an external server (10), which can be addressed from the external network (1) directly or indirectly via the interface server (7) for processing of user inquiries.

In one embodiment, the transaction interface is characterized in that the configuration of the transaction interface (3) is automatically overwritten from the internal network (2) at predeterminable time intervals.

In one embodiment, the transaction interface is characterized in that data filed in the neutral zone (5) are automatically overwritten from the internal network (2) at predeterminable time intervals.

In one embodiment, the transaction interface is characterized in that the interface memory (11) is scalable in such a way that user inquiries received from the external network (1) are sorted into queues (22,22') of the interface server (7) according to scone and urgency, and if necessary additional processes can be activated.

In one embodiment, the transaction interface is characterized in that, within the neutral zone (5) there is located a plurality of network computers, on each of which there is located an interface server (7), wherein additional servers (7) can be activated or deactivated according to the number and/ or power of the user requests, load control being exerted by the external server (10) and/or by the external firewall (4).

In one embodiment, the transaction interface is characterized in that, in the area of the internal network (2), there is located a plurality of network servers, each of which is equipped with an internal server (12), which can be activated or deactivated according to the scope and power of the user requests, load control being exerted by the internal firewall (6) or by one or more interface servers (7).

In one embodiment, the transaction interface is characterized in that the internal server (12) communicates with the internal network (2) via a CORBA bus.

In one embodiment, the transaction interface is characterized in that the entire transaction interface (3) is in data communication via a continuous CORBA bus system.

In one embodiment, the transaction interface is characterized in that the entire internal interface communication takes place with SSL encryption, preferably with encryption according to DES.

In one embodiment, the transaction interface is characterized in that the interface server (7) sends a confirmation request to the user (17) before placement of certain user questions, and further processing takes place only after receipt of confirmation.

In one embodiment, the transaction interface is characterized in that a log that records all transactions processed via the transaction interface (3) is recorded by means of a logging module.

In one embodiment, the transaction interface is characterized in that configuration of the interface server (7) can be performed exclusively from the internal network (2).

In one embodiment, the security level of the inventive device can be further enhanced by the use of an internal and/or external firewall.

The operator friendliness and scope of application of the transaction interface can be enhanced by an additional external server disposed in the neutral zone.

Dynamic configuration of the transaction interface by constant, preferably periodic and in particular automatic overwriting of the configuration from the secure area of the internal network represents a further security feature, since in this way any improper manipulations of the configuration by unauthorized access from the external network are at worst of short duration and therefore the risk in particular of "stealthy" infiltration is eradicated. It has been proved that slowly building attacks represent a considerably greater risk than immediate and massive attacks, which can also be rapidly detected and dealt with.

Drawing from the same security concept, overwriting of the static data contents of the neutral zone at predeterminable time intervals is also a practical improvement of the invention.

In the inventive transaction interface, better load adaptation of the interface memory itself can also be achieved by appropriate scaling to the respective load.

Better load selection is also achieved by providing a plurality of network computers within the neutral zone.

For the same reason, a plurality of network computers can also be provided in the area of the internal network.

By the fact that the inventive transaction interface is provided with a CORBA interface, different operating systems can work together in the area of the internal network and be protected via the inventive transaction interface.

In a particularly advantageous embodiment, the entire transaction interface is provided with continuous CORBA bus architecture.

Communication within the transaction interface is advantageously processed in encrypted form, preferably encrypted according to DES.

By the fact that, according to one embodiment a confirmation request can be sent to the user before processing of corresponding user inquiries, the transaction interface is capable of correctly closing contracts within the Internet. The repeated confirmation of the user inquiry or of the contract achieved in this way ensures unobjectionable closing of the contract in the area of e-commerce.

The entire operation of the transaction interface is recorded by means of an appropriate logging module within a log. All transactions and items of information, such as the waiting time of the respective user inquiry in the queue, the user ID, etc., are registered in this log.

Hereby it is made possible for an administrator to monitor the operation, to track any malfunctions at an early stage and in particular to detect any attempts at improper use.

The invention will be explained in more detail hereinafter by means of one or more practical examples illustrated only schematically in the drawing, wherein:

DETAILED DESCRIPTION

Figure 1:
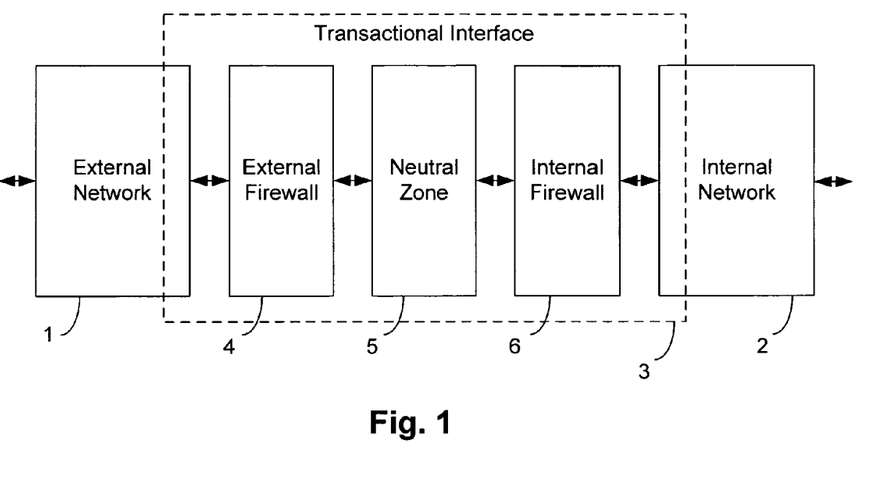
FIG. 1 shows a block diagram of the structure of the transaction interface.

FIG. 1 shows an external network 1 and an internal network 2, which can be brought into data communication with one another via a transaction interface 3.

External network 1 is usually the Internet, while internal network 2 can be the intranet of a company, in many cases a LAN. Strictly speaking, transaction interface 3 is not closed between both networks.

In principle, secure data exchange already begins within external network 1 and ultimately leads to transactions within internal network 2, as illustrated by the broken line in FIG. 1.

In addition, transaction interface 3 is provided with an external firewall 4, which insulates a neutral zone 5 from external network 1.

Neutral zone 5 in turn is insulated from internal network 2 by a further internal firewall 6. The arrows illustrated symbolically in FIG. 1 symbolize only the interaction between the mutually separated areas and not anything such as data-flow directions.

Figure 2:
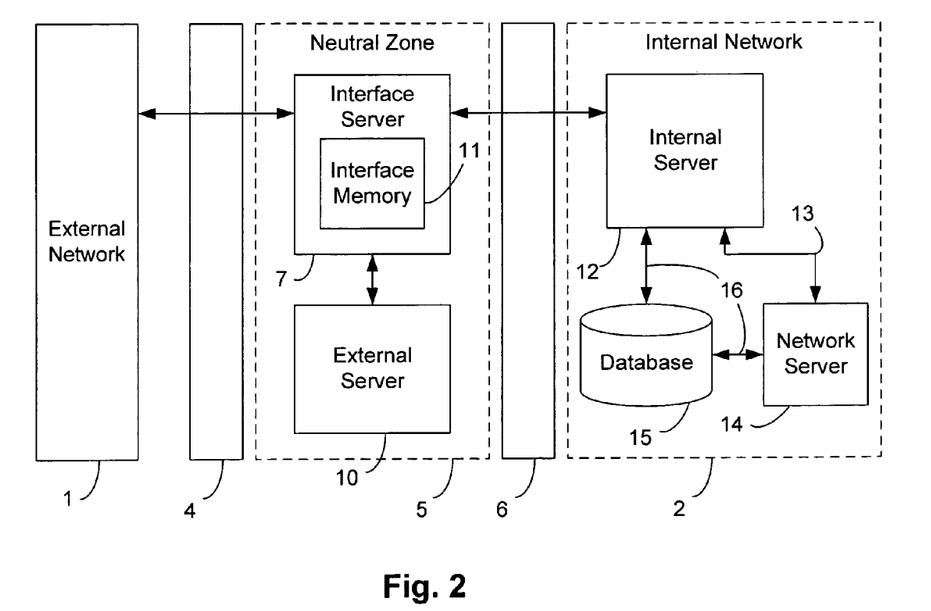
FIG. 2 shows a detailed block diagram of the transaction interface.

As follows from the detailed diagram in FIG. 2, neutral zone 5 comprises an interface server 7 as well as an external server 10. In almost all cases, external server 10 will be a standard web server. Furthermore, an interface memory 11 is provided in the neutral zone, preferably as a constituent of interface server 7. Interface server 7 is in data communication via internal firewall 6 with an internal server 12, which is already disposed within the secure area of internal network 2. Internal server 12 is connected via a CORBA interface 13 to one or more network servers 14 or preferably to distributed database applications 15 via a CORBA bus 16. CORBA bus 16 represents an open bus system, whose purpose is to ensure that the most diverse systems, and therefore also different operating systems, can communicate with one another over this CORBA bus 16.

For example, Unix or Windows operating systems, building-control systems or Sun workstations can be addressed over the same CORBA bus 16.

The said CORBA bus architecture is used in a preferred embodiment for the entire data exchange within transaction interface 3.

Figure 3:
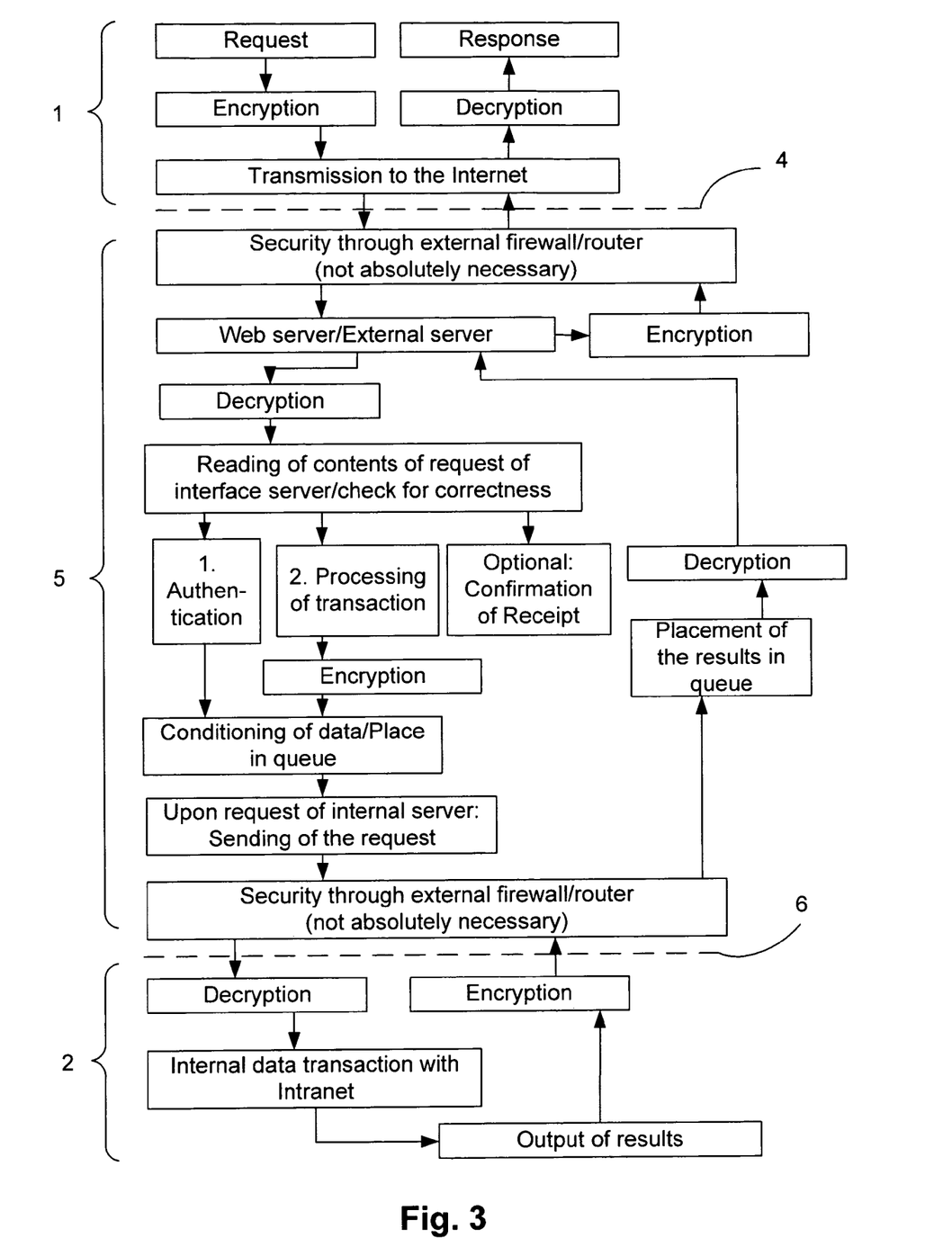
FIG. 3 shows a flow diagram of the method for secure data exchange.

The exact sequence of the method for secure data exchange in response to a user inquiry from external network 1, otherwise known as a request, will be explained in detail hereinafter with reference to FIGS. 3 and 4:

Via the hypertext transport protocol of the Internet, an external user 17 can obtain, for example, an HTML form for data exchange with internal network 2. He then has the opportunity to formulate his request within this HTML form. Use of the HTML form is necessary because only predetermined permissible data transactions are possible within the method of secure data exchange described here. In this respect, the use of HTML forms also ensures that only these predetermined inquiries are formulated by external users 17. Via a client interface 20, such as a Java console, the HTML form is then transmitted in encrypted form through the Internet and, if the external user 17 has the appropriate authorizations or passwords, arrives via an external firewall 4 at external server 10, which is located within neutral zone 5. In the case under consideration here, external server 10 is a web server. Within the scope of the invention, transaction interface 3 can also enter into data communication with other data formats, such as RMI. Thus the exchange operation can also be processed from the Internet by means of older browser types or with other network formats.

Such inquiries are then not processed via external server 10, but go directly to interface server 7.

Under these conditions, it is entirely possible for web server 10 to be a processor unit in its own right or a module of interface server 7. It does not absolutely have to be a closed computing unit. In the practical example illustrated in FIG. 4, neutral zone 5 comprises substantially interface server 7, which is provided with an entire series of modules.

Figure 4:
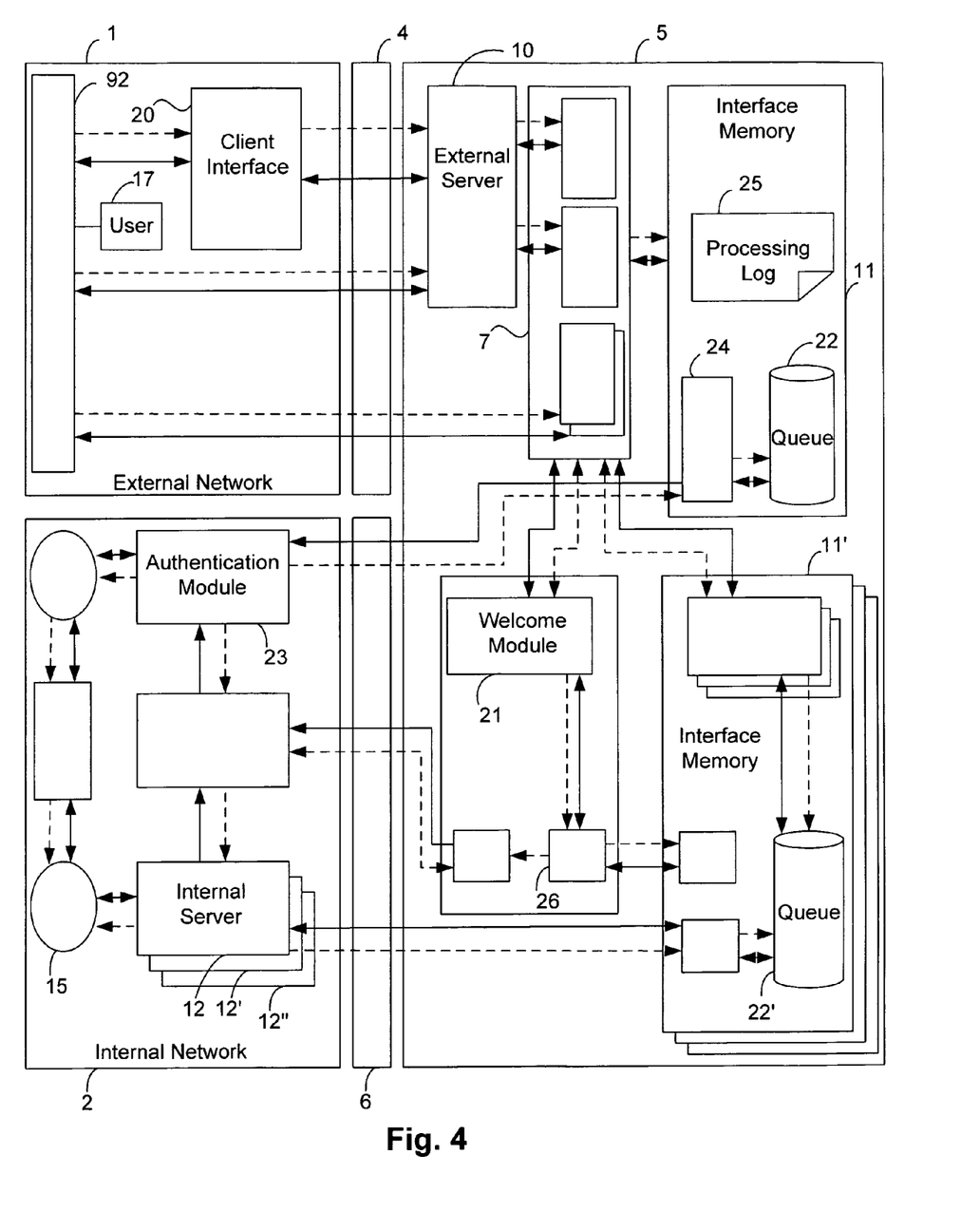
FIG. 4 shows a block diagram of the sequence of the method.

The broken lines ending in arrowheads in FIG. 4 denote a call, which initiates an action at the called location, and the solid lines ending in arrowheads represent data flow in the direction of the arrow.

After reception in web server 10, the inquiry received from the Internet 92 is first read in decrypted form and then sent to interface server 7. Interface server 7 is provided with a welcome module 21 for automatic actuation of reception or for welcoming user 17. Before anything else happens, a confirmation of receipt or greeting for external user 17 is returned via web server 10 and external firewall 4 to user 17.

Depending on the inquiry, it is decided at this time, and user 17 is so notified, as to whether the received inquiry will be processed synchronously or asynchronously. In the case of synchronous processing, the external user will obtain the result of his inquiry while still in the same on-line session.

In contrast, in the case of asynchronous processing, the result is sent to the external user only in a subsequent on-line session or in a separate process. The decision as to whether synchronous or asynchronous processing will take place is based on the power and relevance to security of the inquiry received from external user 17.

Interface server 7 now begins to decompose the received request into uncritical data packets and to place it in a queue 22 or 22', which is located in a special interface memory 11 or 11', which is also located within neutral zone 5.

At least in the practical example under consideration here, a distinction exists between a queue 22 for authentication of user 17 and a queue 22' containing the actual inquiry. In the usual situation a single queue but distinguishable memory areas will be provided.

A conventional user inquiry contains the user ID and a password among other particulars. Using the password submitted by user 17 in connection with his inquiry, the user ID is placed in encrypted form in queue 22.

For authentication of user 17, the respective user ID, upon request of internal server 12, is delivered under scrutiny of internal firewall 6 but otherwise in decrypted form to an authentication module 23 in the area of internal network 2.

Within authentication module 23, using the password filed for the respective user ID in the area of internal network 2, the user ID is encrypted and returned in encrypted form via internal firewall 6 to neutral zone 5.

In neutral zone 5, the respective user ID is then decrypted, using the password entered by user 17, by means of an authentication service 24 of interface server 7 implemented in the neutral zone, and the obtained user ID is compared with the temporarily stored user ID.

If the two IDs are identical, processing is continued or enabled, and if not a message to that effect is sent to external user 17.

Before the inquiry received from external user 17 is placed in appropriately conditioned form in queue 22', verification of the inquiry is performed. Only data records that are semantically correct are placed in the queue. Otherwise processing is aborted and a message to that effect is delivered via web server 10 to external user 17.

Furthermore, a processing log 25 of the currently running processing steps is maintained in neutral zone 5.

Queue 22' set up in interface memory 11' is checked at regular intervals by internal server 12 for any inquiries that are present and that have yet to be processed.

This ensures that access by external user 17 can under no circumstances initiate any kind of activity within protected internal network 2. Instead, access to the inquiries placed in queue 22' takes place automatically within internal server 12. This is an important aspect in preventing any manipulations.

If user inquiries that have yet to be processed are detected within queue 22' in response to a query of queue 22' effected by internal server 12, they are requested by internal server 12. Before the inquiry is sent to internal server 12, however, the inquiry is first encrypted. This encryption is applied in accordance with the DES method, using a 56-bit key length. Obviously different encryption methods and key lengths can also be used. The keys used are monitored and continuously varied by an encryption management function.

Encryption takes place by means of a basic key, which was created during configuration of the system and which establishes asynchronous SSL encryption. Furthermore, synchronous DES encryption then takes place using this basic key.

In particular, the keys used have only an individually configurable life. This means that a narrow time corridor for secure data exchange is opened upon allocation of the key. After expiration of the life, however, the key can no longer be used, even if an unauthorized person were to succeed in decrypting it. Hereby improper second use of keys is almost precluded.

This new encryption of the inquiry before it is sent to internal server 12 is used primarily to prevent hacking from internal sources, or in other words listening to confidential user inquiries in the area of protected internal network 2.

Hereby the described method additionally prevents espionage from internal sources during secure data exchange. The inquiry encrypted in this way is checked once again as to structure, content and field contents.

If the inquiry now generated proves to be not permissible, further processing is aborted at this location and a message to this effect is sent to external user 17.

If the inquiry is still permissible and therefore corresponds to a predetermined data inquiry or transaction, the inquiry in question is sent via internal firewall 6 of transaction interface 3 to internal server 12. Depending on relevance to security and power, the database inquiry can be processed on one or more servers 12, 12' or 12", using one or more database applications 15. Thus all processes relevant to safety are processed in the secure area of internal network 2.

For this purpose the inquiry that has arrived at internal server 12 must first be decrypted before further processing.

After the request has been processed, the result is output and returned in encrypted form via internal firewall 6 to interface server 7. Interface server 7 then performs a "matching check"; in other words a check is run to determine whether the result generated in the area of internal network 2 matches the user inquiry. If this is not the case, an error message is sent to external user 17.

If a match exists, the result is sent to web server 10, converted to a suitable format and then transmitted via external firewall 4 over the Internet 92 to external user 17. Thus a complete data transaction using inventive transaction interface 3 has been described.

Above and beyond this, transaction interface 3 is provided with dynamic load control, which permits adaptation of transaction interface 3 to the respective "traffic". In addition, as is evident from FIG. 4, load-dependent scaling of interface memory 11' can be effected on the basis of the traffic. This is illustrated in FIG. 4 by the possible multiple presence of the area denoted by reference symbol 11'.

This means that, depending on the load that is present, interface server 7 arranges the received requests in proper sequence in queue 11 or 11' and if necessary activates further processes or in other words parallel queues 11', which can be processed in parallel. For this purpose a plurality of interface servers 7, 7' or server areas can also be provided within neutral zone 5, to be activated depending on load. This load control is exercised either by web server 10 or by a module of external firewall 4 or by a load-control module 26 of interface server 7.

The load-management function described in the foregoing is advantageously supported by corresponding load control in the area of internal network 2 as well.

Thus, depending on the load that is present, a plurality of internal servers 12, 12' can be activated or disabled and additional database applications 15 can be activated for processing of the received volume of inquiries in the area of internal network 2.

In this connection it is helpful to provide entire transaction interface 3 with a continuous CORBA bus architecture, so that each inquiry can be allocated to one or more server processes.

For this purpose, internal server 12 acting within internal network 2 is equipped with a CORBA interface 13.

Interior and exterior firewalls 4 and 6 used in the system can be completely conventional software products. In all other respects the CORBA bus permits interconnection of different operating systems such as Windows, NT or Unix within the internal network.

The special architecture of transaction interface 3 described in the foregoing ensures that the minimum requirements applicable in connection with effective closing of contracts in the area of e-commerce are met. For example, a request sent via web server 10 to interface server 7 can first be checked to determine whether it is a contract request. If it is such a request, a contract module set up on interface server 7 can first send a confirmation request to the external user before further processing, after which further processing can take place as described in the foregoing only if this confirmation is received via web server 10.

Above and beyond this, interface server 7 is provided with a logging module, which logs all transactions of transaction interface 3. Hereby all processes can be constantly monitored by an administrator and any malfunctions or attempts at improper use can be detected immediately.

The administrator is located exclusively in the area of internal network 2. Configuration of the transaction interface is possible only from this location.

In this way there is created, for secure data exchange between two distinguishable networks 1, 2, a method and a transaction interface 3 that work with high performance while ensuring complete decoupling of networks 1 and 2, and that make improper use from both external and internal sources seem impossible.

LIST OF REFERENCE SYMBOLS

1 external network
2 internal network
3 transaction interface
4 external firewall
5 neutral zone
6 internal firewall
7 interface server
10 external server
11 interface memory
12, 12', 12" internal servers
13 CORBA interface
14 network server
15 database application
17 external user
20 client interface
21 welcome module
22, 22' queues
23 authentication module
24 authentication service
25 session log
26 load-control module

The invention claimed is:

1. A method of secure data exchange comprising:
  receiving, through an external firewall, a user request from an external network in a first interface server;
  comparing, on the first interface server, the user request with a set of permissible requests;
  storing the user request in an interface memory coupled to the first interface server;
  checking, through an internal firewall, the interface memory exclusively from an internal server on an internal network;
  processing the user request in the internal server if the user request matches one of the permissible requests; and
  not processing the user request in the internal server if it does not match one of the permissible requests.

2. The method of claim 1 wherein the permissible requests have a predefined form and the received user request is verified for compliance with the predefined form.

3. The method of claim 1 wherein communication between the internal server and the first interface server is unidirectional such that calls into the first interface server are only accepted from the internal server and calls into the internal server from the first interface server are not possible.

4. The method of claim 1 further comprising:
  generating a processing result in the internal server;
  sending the result to the first interface server; and
  determining if the result corresponds to the user request.

5. The method of claim 1 further comprising verifying the semantics of the user request.

6. The method of claim 5 further comprising processing the user request in the internal server if the semantics are verified.

7. The method of claim 1 further comprising authenticating the user request and processing the user request if the user request has been authenticated.

8. The method of claim 1 wherein the internal server checks the interface memory at regular intervals.

9. The method of claim 1 wherein the interface memory is scaled based on traffic.

10. A method of secure data exchange comprising:
  receiving, from an external network through an external firewall, a user request in a first interface server;
  verifying the user request on the first interface server based on permissible requests;
  storing the user request in memory coupled to the first interface server if the user request is verified;
  querying the memory exclusively from an internal server on an internal network through an internal firewall to determine if the user request was verified as permissible; and
  sending the user request to the internal server when the query indicates the user request was verified as permissible, wherein the user request is not sent to the internal server if the query indicates the user request was not permissible.

11. The method of claim 10 wherein the memory is queried at a defined frequency.

12. The method of claim 10 further comprising:
  processing the user request in the internal server, and in accordance therewith, generating a result;
  sending the result from the internal server to the first interface server, and
  determining if the result corresponds to the user request.

13. The method of claim 12 further comprising encrypting the result before sending the result to the first interface server.

14. The method of claim 10 wherein communication between the internal server and the first interface server is unidirectional such that calls into the first interface server are only accepted from the internal server and calls into the internal server from the first interface server are not possible.

15. The method of claim 10 further comprising encrypting the user request before sending the user request to the internal server.

16. The method of claim 15 wherein encrypting is synchronous.

17. The method of claim 15 wherein encrypting is asynchronous.

18. The method of claim 15 wherein encrypting uses a key that expires after a period of time.

19. The method of claim 15 wherein encrypting uses a key that is continuously varied.

20. The method of claim 15 wherein encrypting uses a key that has an individually configurable life so that a narrow time corridor for secure data exchange is opened upon allocation of the key.

21. The method of claim 15 further comprising decrypting the user request on the internal server.

22. The method of claim 10 wherein the user request is sent to the internal server if the user request corresponds to a predetermined transaction.

23. The method of claim 10 wherein verifying the user request comprises verifying the semantics of the user request.

24. A secure data exchange system comprising:
a first interface server;
an interface memory coupled to the first interface server;
a first firewall coupled between the first interface server and an external network;
a second firewall coupled between the first interface server and an internal server on an internal network,
wherein the first interface server receives a user request from the external network, wherein the user request is compared with a set of permissible requests, wherein the user request is stored in the interface memory, and wherein the interface memory is queried exclusively from the internal server; and
wherein the user request is sent to the internal server for processing in response to the query if the user request matches a permissible request, and the user request is not sent to the internal server for processing if the user request does not match the permissible request.

25. The system of claim 24 wherein communication between the internal server and the first interface server is unidirectional.

26. The system of claim 25 wherein calls into the first interface server are only accepted from the internal server and calls into the internal server from the first interface server are not possible.

27. The system of claim 24 wherein the user request is received in the first interface server through the first firewall and the semantics of the user request are verified.

28. The system of claim 27 wherein the user request is stored in the interface memory if the user request is verified.

29. The system of claim 28 wherein the user request is stored in the interface memory in encrypted form.

30. The system of claim 24 wherein the interface memory is interrogated exclusively from the internal network for user requests received from the external network.

31. The system of claim 24 further comprising a second server coupled to the first interface server, wherein the second server converts user requests received from the external network and forwards the results to the first interface server.

32. The system of claim 31 wherein the second server is a web server.

33. The system of claim 31 wherein the second server sends a confirmation of receipt of user requests.

34. The system of claim 24 further comprising a load control module for scaling the interface memory based on traffic.

35. The system of claim 24 further comprising a logging module for logging transactions in the first interface server.

36. A system of secure data exchange comprising:
means for receiving a user request from an external network through an external firewall in a first interface server;
means for comparing, on the first interface server, the user request with a set of permissible requests;
means for storing the user request in the first interface server;
means for checking for stored user requests exclusively from an internal server on an internal network through an internal firewall and sending the user request to the internal network only if the user request matches one of the permissible requests; and
means for processing the user request in the internal network.

37. The system of claim 36 further comprising means for authenticating user requests received from the external network.

38. A method of secure data exchange comprising:
receiving one or more requests from an external user in a portal in an external network to perform a data transaction with an internal network, wherein the requests are conditioned by an interface server in a neutral zone and temporarily stored in precisely defined form in an interface memory in the neutral zone, wherein the neutral zone is behind, in access direction, the external network; and
exclusively interrogating the interface memory from an internal server located in the internal network at a defined frequency,
wherein complete processing of the data transaction includes authenticating the user within the internal network, wherein the user is authenticated while the one or more requests are stored in the interface memory and the one or more requests are not processed within the internal network if the user is not authenticated,
wherein secure data exchange between the external and internal network is via a transaction interface in which the external user performs predetermined data transactions within the internal network, and wherein the transaction interface comprises said portal, said neutral zone, and said internal server.

39. The method of claim 38 wherein the following steps occur in sequence:
a request from the external user is read and acknowledged by the interface server;
an acknowledgement is sent to the external user;
the interface server checks the permissibility of the request by comparison with a set of predetermined permissible requests and the semantic correctness of the request, wherein the request is rejected if the request is in error and the request is further processed if the request is not in error, wherein further processing comprises:
placing the request in a queue in the interface memory;
querying the interface memory at a specified frequency from the internal server;
sending, in response to the query, the request to the internal network;
authenticating, on the internal network, the external user;
returning an authentication result to the interface server;
checking the authentication result on the interface server to determine if the authentication result and the external user request match; and
generating an output response to the external user if the authentication result and the external user request match.

40. The method of claim 38 wherein authenticating the user includes the following steps in sequence:
a user ID and a user password are separated, in the neutral zone, from a request;
upon request of the internal server, the user ID is sent to the internal network;
the user ID is encrypted in the internal network using a prestored password for the user ID in the internal network;
the encrypted user ID is delivered back into the neutral zone;
the encrypted user ID is decrypted in the neutral zone using the user password, said user password being stored temporarily in the neutral zone;

the decrypted user ID and a user ID entered by the user are compared;

wherein authenticity of the user is confirmed in the case of a match and denied otherwise, and wherein the user inquiry is further processed if confirmed and is not further processed if denied.

41. A computer system comprising modules containing software for controlling the computer system to perform a method for secure data exchange, wherein the computer system comprises a first interface server and an internal server, the method comprising:

receiving, through an external firewall, a user request from an external network in the first interface server;

comparing, on the first interface server, the user request with a set of permissible requests;

storing the user request in an interface memory coupled to the first interface server;

checking, through an internal firewall, the interface memory exclusively from the internal server on an internal network;

processing the user request in the internal server if the user request matches one of the permissible requests; and not processing the user request in the internal server if it does not match one of the permissible requests.

42. The computer system of claim 41 wherein the permissible requests have a predefined form and the received user request is verified for compliance with the predefined form.

43. The computer system of claim 41 wherein communication between the internal server and the first interface server is unidirectional such that calls into the first interface server are only accepted from the internal server and calls into the internal server from the first interface server are not possible.

44. The computer system of claim 41 further comprising:
generating a processing result in the internal server;
sending the result to the first interface server; and
determining if the result corresponds to the user request.

45. The computer system of claim 41 further comprising verifying the semantics of the user request.

46. The computer system of claim 45 further comprising processing the user request in the internal server if the semantics are verified.

47. The computer system of claim 41 further comprising authenticating the user request and processing the user request if the user request has been authenticated.

48. The computer system of claim 41 wherein the internal server checks the interface memory at regular intervals.

49. The computer system of claim 41 wherein the interface memory is scaled based on traffic.

* * * * *